(12) United States Patent
Smith

(10) Patent No.: US 11,525,399 B1
(45) Date of Patent: Dec. 13, 2022

(54) OIL SYSTEM WITH FLOW RESTRICTOR

(71) Applicant: PRATT & WHITNEY CANADA CORP., Longueuil (CA)

(72) Inventor: Sarah Nangle Smith, Guelph (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 1 day.

(21) Appl. No.: 17/350,950

(22) Filed: Jun. 17, 2021

(51) Int. Cl.
*F02C 7/06* (2006.01)
*F02C 7/14* (2006.01)

(52) U.S. Cl.
CPC ............ *F02C 7/06* (2013.01); *F02C 7/14* (2013.01); *F05D 2260/213* (2013.01); *F05D 2260/98* (2013.01)

(58) Field of Classification Search
CPC .... F02C 7/224; F02C 7/14; F02C 7/06; F05D 2260/213; F05D 2260/98; F05D 2270/301
See application file for complete search history.

(56) References Cited

U.S. PATENT DOCUMENTS

| 4,696,156 | A | * | 9/1987 | Burr | B64D 37/34 60/39.08 |
| 4,741,152 | A | * | 5/1988 | Burr | F02C 7/224 60/39.08 |
| 8,997,449 | B2 | * | 4/2015 | Logan | F01D 25/18 138/40 |
| 9,097,169 | B2 | * | 8/2015 | Logan | F02C 7/06 |
| 2003/0097872 | A1 | * | 5/2003 | Granitz | F01D 25/20 73/112.01 |
| 2006/0081419 | A1 | * | 4/2006 | Care | F16N 7/40 184/6.11 |
| 2007/0193276 | A1 | * | 8/2007 | Corattiyil | F01D 25/125 60/785 |
| 2008/0271456 | A1 | * | 11/2008 | Scully | F02C 9/263 60/740 |
| 2010/0028145 | A1 | * | 2/2010 | Young | F15D 1/02 415/208.1 |
| 2010/0154427 | A1 | * | 6/2010 | Logan | F16N 7/40 60/39.08 |

(Continued)

FOREIGN PATENT DOCUMENTS

CA 2723792 A1 * 11/2008 ............... C01B 3/22

*Primary Examiner* — Craig Kim
(74) *Attorney, Agent, or Firm* — Norton Rose Fulbright Canada LLP.

(57) ABSTRACT

An oil system, has: a pump driving an oil flow in an oil conduit, the pump having an outlet pump pressure; a heat exchanger providing heat exchange between the oil flow and one or more fluid; a component downstream of the heat exchanger, the component having a maximum oil pressure requirement and a minimum oil pressure requirement; and a flow restrictor in fluid flow communication with the oil conduit, the flow restrictor having an orifice sized to provide a restrictor pressure differential across the flow restrictor, the restrictor pressure differential being equal to at least the outlet pump pressure minus pressure differentials through the heat exchanger and the oil conduit from an outlet of the pump to the component minus the maximum oil pressure requirement, and at most the outlet pump pressure minus the pressure differentials through the heat exchanger and the oil conduit minus the minimum oil pressure requirement.

18 Claims, 6 Drawing Sheets

(56) References Cited

U.S. PATENT DOCUMENTS

| | | | | |
|---|---|---|---|---|
| 2010/0186410 | A1* | 7/2010 | Cogswell | F01D 25/18 |
| | | | | 62/84 |
| 2012/0128467 | A1* | 5/2012 | Ruthemeyer | F02C 7/143 |
| | | | | 165/181 |
| 2013/0087308 | A1* | 4/2013 | Logan | F02C 7/224 |
| | | | | 165/51 |
| 2014/0144154 | A1* | 5/2014 | Legare | F01D 25/16 |
| | | | | 60/785 |
| 2015/0192073 | A1* | 7/2015 | Griffiths | F02C 7/22 |
| | | | | 60/734 |
| 2016/0178204 | A1* | 6/2016 | Wang | F02C 7/224 |
| | | | | 137/565.13 |
| 2016/0265400 | A1* | 9/2016 | Krug | F01D 25/18 |
| 2016/0305284 | A1* | 10/2016 | Mastro | F01D 25/20 |
| 2018/0306062 | A1* | 10/2018 | Avis | F01M 1/02 |
| 2018/0372321 | A1* | 12/2018 | Yates | F23R 3/283 |
| 2019/0024478 | A1* | 1/2019 | Mathiesen | E21B 34/14 |
| 2020/0217175 | A1* | 7/2020 | Mathiesen | E21B 34/08 |
| 2022/0065062 | A1* | 3/2022 | Caminari | E21B 34/14 |
| 2022/0106053 | A1* | 4/2022 | Snyder | F02K 7/10 |
| 2022/0178306 | A1* | 6/2022 | Durand | F02C 9/40 |
| 2022/0178544 | A1* | 6/2022 | Durand | F23R 3/36 |

* cited by examiner

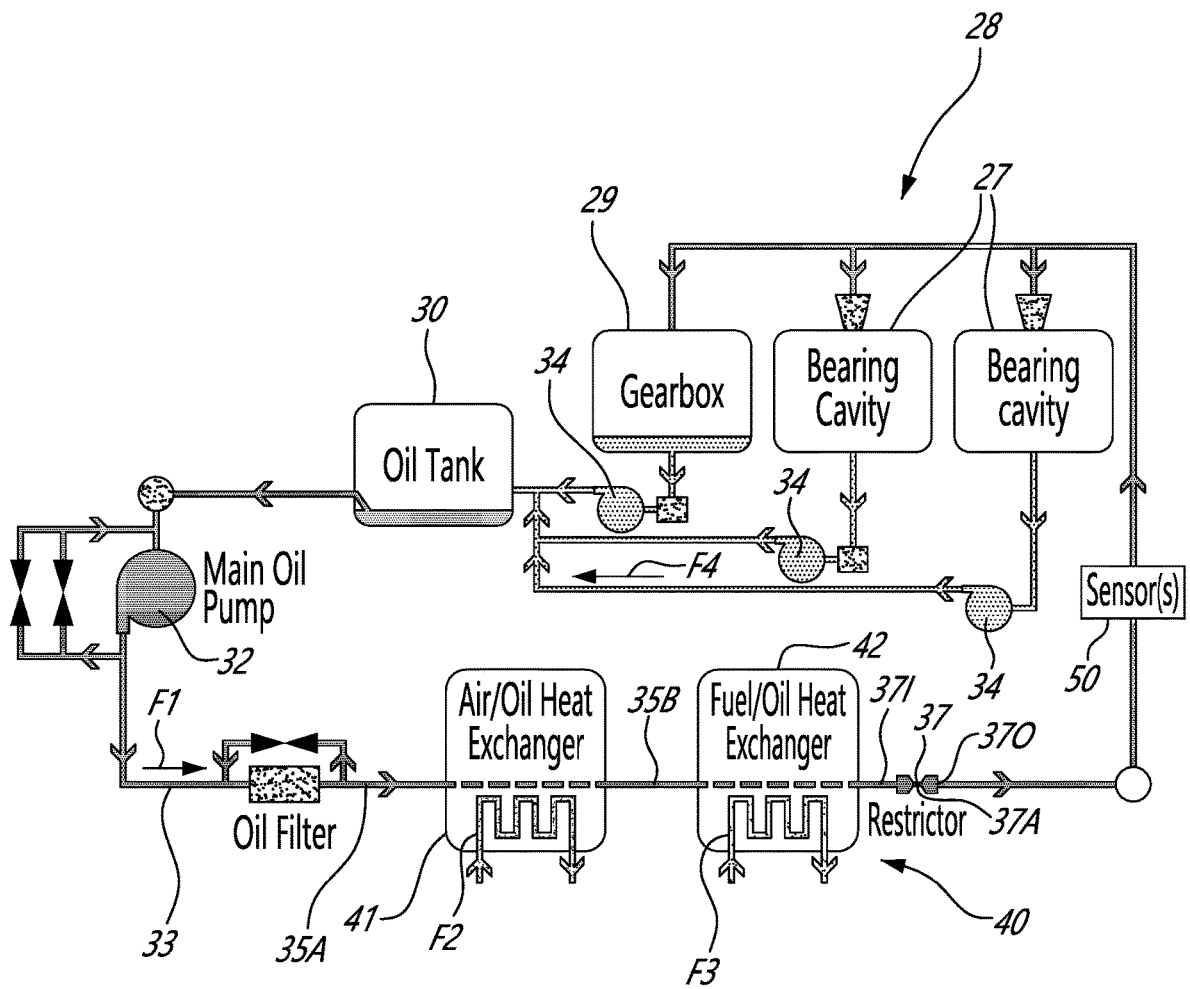

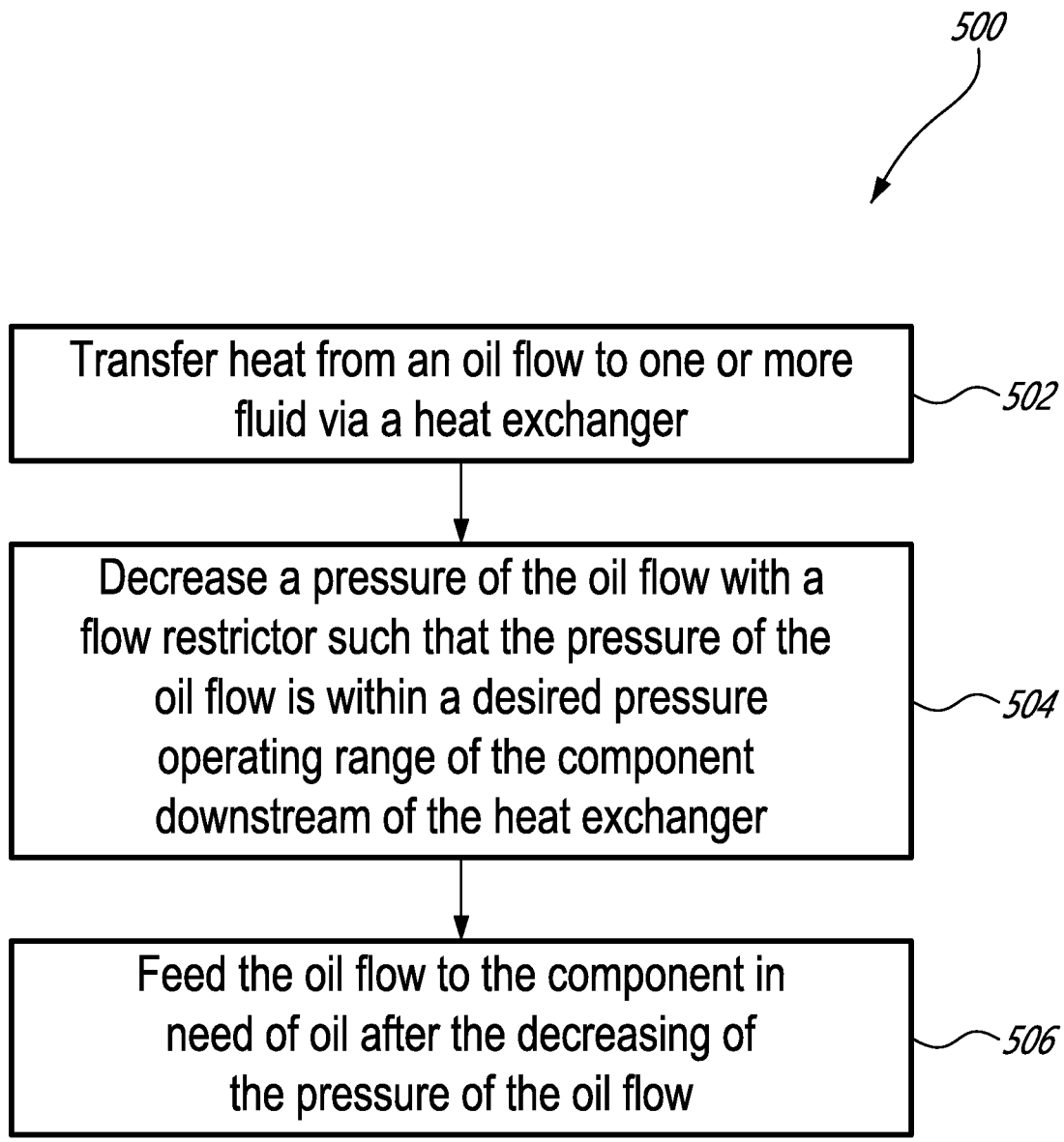

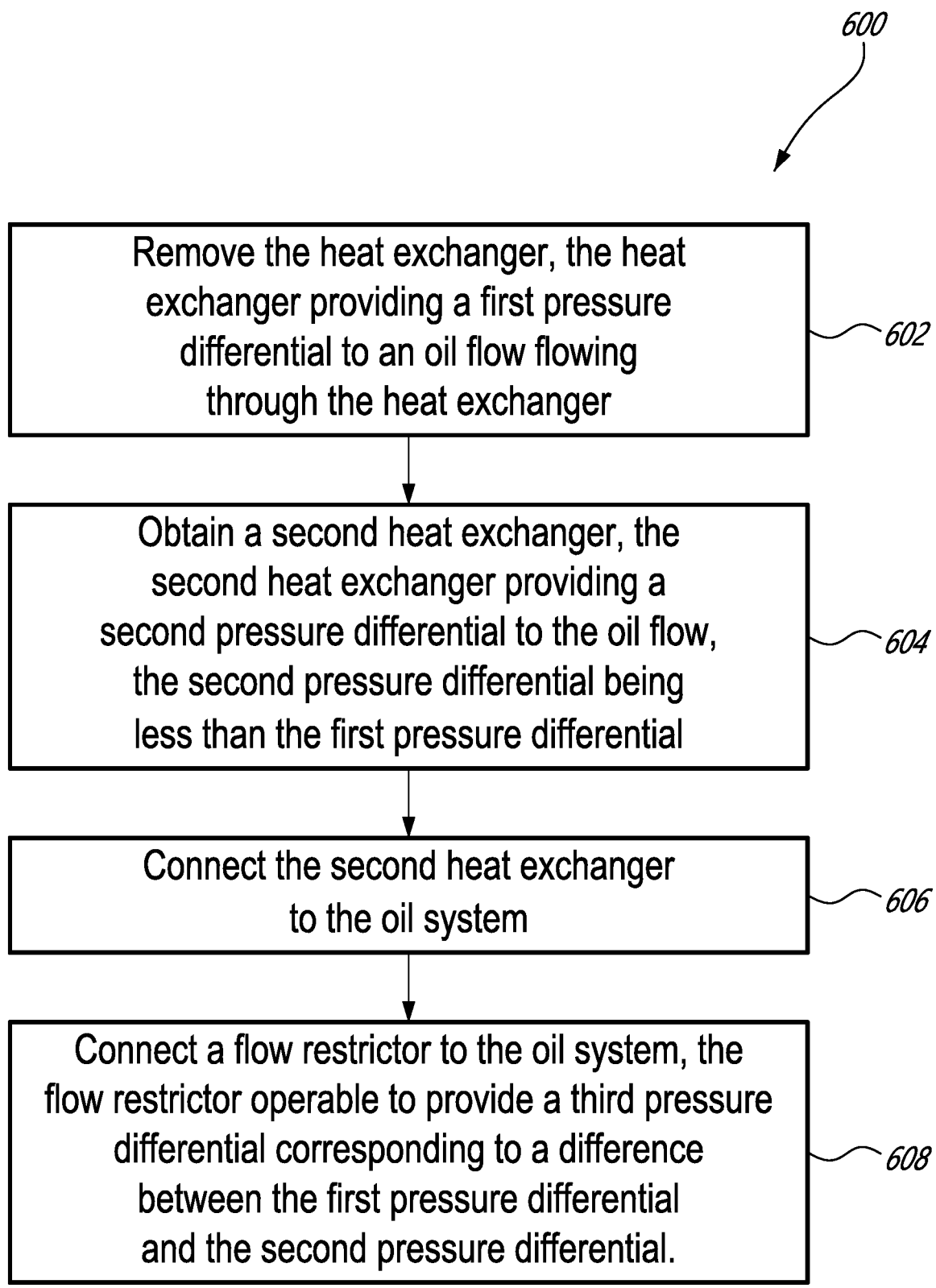

OIL SYSTEM WITH FLOW RESTRICTOR

TECHNICAL FIELD

The application relates generally to aircraft engines and, more particularly, to heat exchanger systems used in oil systems of such engines.

BACKGROUND OF THE ART

Aircraft engines use heat exchangers for various reasons. Such an aircraft engine heat exchanger may include an air-cooled oil cooler (ACOC), which is used to cool bearing oil with ambient air, and a fuel-oil heat exchanger (FOHE), sometimes referred to as a fuel/oil cooler, which is typically used to simultaneously heat the fuel prior to its injection into a combustion chamber and to cool bearing oil. In an aircraft, costs, maintenance, weight and size can be important considerations when designing the fluid systems. The size of the heat exchanger is typically directly related to its heat exchange capacity. There is an ever-present need for improvements in the field of aircraft heat exchangers and their methods of use.

SUMMARY

In one aspect, there is provided an oil system for an aircraft engine, comprising: a pump driving an oil flow in an oil conduit, the pump having an outlet pump pressure; a heat exchanger providing heat exchange between the oil flow and one or more fluid; a component downstream of the heat exchanger, the component fluidly connected to the oil conduit for receiving at least a portion of the oil flow, the component having a maximum oil pressure requirement and a minimum oil pressure requirement; and a flow restrictor in fluid flow communication with the oil conduit, the flow restrictor having an orifice sized to provide a restrictor pressure differential across the flow restrictor, the restrictor pressure differential being equal to at least the outlet pump pressure minus pressure differentials through the heat exchanger and the oil conduit from an outlet of the pump to the component minus the maximum oil pressure requirement, and at most the outlet pump pressure minus the pressure differentials through the heat exchanger and the oil conduit minus the minimum oil pressure requirement.

The oil system may include any of the following features in any combinations.

In some embodiments, the component includes one or more bearing cavity and/or a gearbox.

In some embodiments, the heat exchanger includes a first heat exchanger providing heat exchange between the oil flow and an air flow and a second heat exchanger providing heat exchange between the oil flow and a fuel flow.

In some embodiments, the flow restrictor is hydraulically connected to the oil conduit downstream of the second heat exchanger.

In some embodiments, the flow restrictor is hydraulically connected on the oil conduit upstream of the first heat exchanger.

In some embodiments, a size of the orifice is variable.

In some embodiments, a member is movable to vary the size of the orifice, the member engaged by an actuator.

In some embodiments, the actuator is operatively connected to a controller having a processing unit operatively connected to a computer-readable medium having instructions stored thereon executable by the processing unit for: receiving a signal from at least one sensor, the signal indicative of an oil pressure in the oil conduit; determining that the oil pressure is outside a desired pressure operating range of the component based on the signal received from the at least one sensor; and changing the size of the orifice until the oil pressure is within the desired pressure operating range.

In some embodiments, the receiving of the signal from the at least one sensor includes receiving the signal from a pressure sensor and/or a temperature sensor operatively connected to the oil conduit.

In some embodiments, the changing of the size of the orifice includes: determining that the oil pressure is below the minimum oil pressure requirement; and increasing the size of the orifice.

In some embodiments, the changing of the size of the orifice includes: determining that the oil pressure is above the maximum oil pressure requirement; and decreasing the size of the orifice.

In some embodiments, the changing of the size of the orifice includes powering the actuator.

In another aspect, there is provided a method of feeding oil of an oil system to a component of an aircraft engine, comprising: transferring heat from an oil flow to one or more fluid via a heat exchanger; decreasing a pressure of the oil flow with a flow restrictor such that the pressure of the oil flow is within a desired pressure operating range of the component downstream of the heat exchanger; and feeding the oil flow to the component in need of oil after the decreasing of the pressure of the oil flow.

The method may include any of the following features, in any combinations.

In some embodiments, the decreasing of the pressure with the flow restrictor includes flowing the oil flow through the flow restrictor having an orifice sized to create a restrictor pressure differential being equal to: at least an outlet pump pressure of a pump driving the oil flow in an oil conduit of the oil system minus pressure differentials through the heat exchanger and the oil conduit from an outlet of the pump to the component minus a maximum oil pressure requirement of the desired pressure operating range, and at most the outlet pump pressure minus the pressure differentials through the heat exchanger and the oil conduit minus a minimum oil pressure requirement of the desired pressure operating range.

In some embodiments, the method includes dynamically adjusting the pressure of the oil flow.

In some embodiments, the method includes receiving a signal from at least one sensor, the signal indicative of the pressure; determining that the pressure is outside the desired pressure operating range of the component based on the signal received from the at least one sensor; and changing a size of an orifice until the pressure is within the desired pressure operating range.

In some embodiments, the receiving of the signal from the at least one sensor includes receiving the signal from a pressure sensor and/or a temperature sensor operatively connected to the oil system.

In some embodiments, the changing of the size of the orifice includes: determining that the pressure is below a minimum oil pressure requirement; and increasing the size of the orifice.

In some embodiments, the changing of the size of the orifice includes: determining that the pressure is above a maximum oil pressure requirement; and decreasing the size of the orifice.

In another aspect, there is provided a method of replacing a heat exchanger of an oil system of an aircraft engine, comprising: removing the heat exchanger, the heat exchanger providing a first pressure differential to an oil flow flowing through the heat exchanger; obtaining a second heat exchanger, the second heat exchanger providing a second pressure differential to the oil flow, the second pressure differential being less than the first pressure differential; connecting the second heat exchanger to the oil system; and connecting a flow restrictor to the oil system, the flow restrictor operable to provide a third pressure differential corresponding to a difference between the first pressure differential and the second pressure differential.

DESCRIPTION OF THE DRAWINGS

Reference is now made to the accompanying figures in which:

FIG. 2 is a schematic view of an oil system of the aircraft engine of FIG. 1;

FIG. 5 is a flow chart illustrating steps of feeding oil to a component of the oil system of FIG. 2; and FIG. 6 is a flow chart illustrating steps for replacing a heat exchanger.

DETAILED DESCRIPTION

Figure 1:
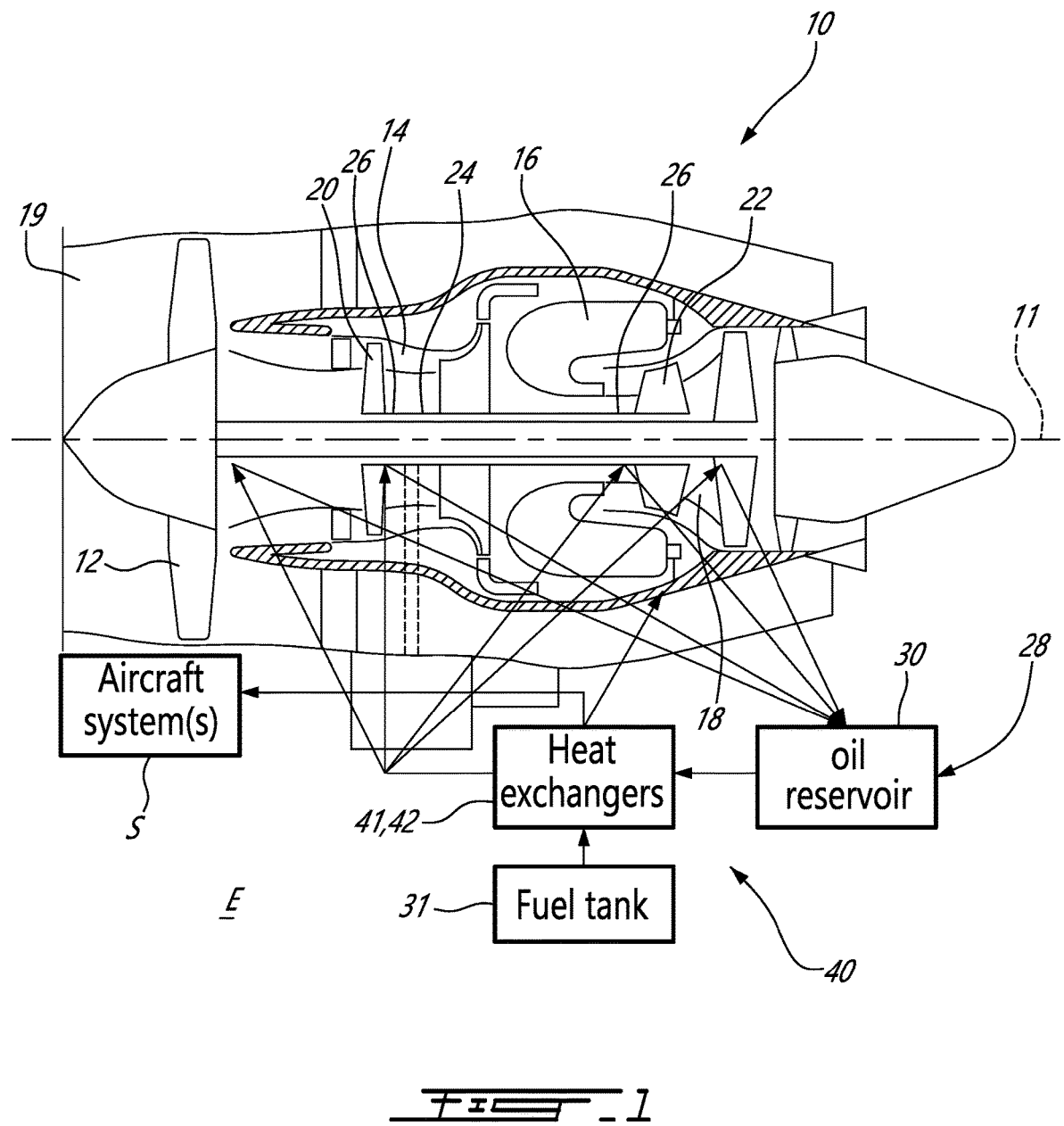
FIG. 1 is a schematic cross sectional view of a gas turbine engine.

FIG. 1 illustrated an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. More specifically, the gas turbine engine 10 has a core gas path including an intake 19 for receiving air. The compressor section 14 has at least one compressor 20 extending across the core gas path and the turbine section 18 has at least one turbine 22 extending across the core gas path, with the at least one compressor 20 and the at least one turbine 22 being rotatable with a rotary shaft 24 supported within the gas turbine engine 10 by bearings 26. The bearings 26 may be contained within bearing cavities 27 (FIG. 2) that may be hydraulically connected to an oil source to receive oil for lubrication. An oil system 28 is provided for circulating oil to the bearings 26 and back to an oil reservoir 30. It will be appreciated that the principles of the disclosure apply to any aircraft engines, such as internal combustion engines (e.g., piston engine, rotary engine), any type of gas turbine engines, (e.g., turbofan, turboshaft, and turboprop), and auxiliary power unit.

In the embodiment shown, the gas turbine engine 10 has a heat exchange system 40 that is used to exchange heat between different fluids for proper operation of the gas turbine engine 10. In the present case, the heat exchange system 40 includes a first heat exchanger 41, which may be referred to as a air-cooled oil cooler (ACOC), which is used to transfer heat from the oil to an environment E outside the gas turbine engine 10. The heat exchange system 40 further includes a second heat exchanger 42, which may be referred to as a fuel-oil heat exchanger (FOHE), used for transferring heat from the oil of the oil system 28 to fuel flowing from a fuel reservoir 31, or any other fuel source, to the combustor 16 of the gas turbine engine 10 for combustion. Pre-heating the fuel as such may increase efficiency of the combustion of the fuel and may cool down the oil that heats up while lubricating the bearings 26. In some cases, the first heat exchanger 41 may be used to transfer or extract heat to/from an aircraft system S in need.

Referring to FIG. 2, the oil system 28 and the heat exchange system 40 are shown in greater detail. The oil system 28 includes an oil pump 32 that drives an oil flow F1 within an oil conduit 33 from the oil reservoir 30. The oil system 28 may be a pressure regulated system in which a pressure regulating valve may be connected in parallel to the oil pump 32. The oil flow F1 exchanges heat with an airflow F2 through the first heat exchanger 41 and exchanges heat with a fuel flow F3 through the second heat exchanger 42. The oil flow F1 is then distributed between different components in need of oil. These components may include, for instance, one or more bearing cavity(ies) 27 and/or a gearbox 29 in some embodiments. Used oil is then scavenged and scavenge pumps 34 drive a scavenge oil flow F4 from scavenge outlets of the bearing cavities 27 and the gearbox 29 back to the oil reservoir 30 where the oil may be flown back to the oil pump 32. A de-oiler and/or de-aerator may be used to remove air from the scavenge oil flow F4.

The bearing cavities 27 and/or the gearbox 29, or any other components in need of oil, may have a desired pressure operating range such that operation of these components may be impaired if oil at a pressure above a maximum pressure threshold or below a minimum pressure threshold is fed to these components. In some cases, it may be desired to replace one or more of the first heat exchanger 41 and the second heat exchanger 42 with lighter and/or more efficient variants. In some cases, one of the first and second heat exchangers may be removed altogether. However, a pressure differential across a lighter and/or more efficient variant of these replacement heat exchangers may be less than their original counterparts. Hence, an oil pressure may not decrease as much as it used to with the original counterparts. This may yield an higher oil pressure being fed to the different components downstream of these heat exchangers. As explained above, this may impair proper operation of these components, may impact scavenge pump margins, and may impact lubrication management of these components. Re-designing and/or modifying the downstream components (e.g., bearing cavity, gearbox) such that they are able to accept this increased oil pressure may be a complicated task and may involve significant resources. This may involve resizing the oil system components (e.g., oil jet nozzles, scavenge pumps, adding baffles to manage added flow, etc). This is thus undesirable.

In the embodiment shown, a flow restrictor 37 is hydraulically connected to the oil conduit 33. The flow restrictor 37 is used to increase a pressure differential up to a point where the oil that reaches the components is within the desired pressure operating range of these components. This desired pressure operating range includes a minimum oil pressure requirement and a maximum oil pressure requirement. The flow restrictor 37 may define a constriction or orifice 37A having a size selected to bring the pressure within the desired pressure operating range. The size of the constriction may be selected such as to provide a pressure differential across the flow restrictor 37. The pressure differential of the flow restrictor 37 may be equal to at least an outlet pump pressure at an outlet of the oil pump 32 minus pressure differentials through the first heat exchanger 41 and the second heat exchanger 42 and through the oil conduit 33 from the outlet of the oil pump 32 to the component minus the maximum oil pressure requirement. The pressure differential of the flow restrictor 37 may be equal to at most the outlet pump pressure minus the pressure differentials through the first heat exchanger 41 and the second heat exchanger 42 and through the oil conduit 33 minus the minimum oil pressure requirement. It will be appreciated that the pressure differentials through the oil conduit 33 includes pressure differentials generated by any intermediate components (e.g., filter, valve, etc.) located between the oil pump and the component in need of oil. The size of this orifice 37A may be selected to increase a pressure differential between an inlet 37I and an outlet 37O of the flow restrictor 37 at any temperature of the oil. The system may be shielded from temperature effects as the pressure regulating valve may ensure that a constant regulated pump outlet pressure is achieved. The constriction may be a narrowing or reduced cross-sectional area of the available flow passage. The oil is more viscous when cold and more fluid when warm. In some cases, the size of the orifice 37A is selected to provide a pressure differential in the oil pressure through the flow restrictor 37 above a pressure differential that would occur in the oil conduit 33 if the flow restrictor 37 were absent. The flow restrictor 37 may be operable to provide a pressure differential that may correspond to a difference between a pressure differential generated by the original heat exchanger and a pressure differential generated by a replacement heat exchanger, whether it be a replacement ACOC or a replacement FOHE.

The flow restrictor 37 may be located anywhere on the oil conduit 33 downstream of the oil pump 32 and upstream of the different components (e.g., gearbox 29, bearing cavities 27). If the replacement heat exchanger is a replacement FOHE, it may be preferable to locate the flow restrictor 37 downstream of the replacement FOHE for safety reasons and to ensure that the oil pressure is higher than the fuel pressure such that any leaks may result in the oil flow F1 moving into the fuel flow F3 rather than the opposite. However, if the replacement heat exchanger is a replacement ACOC, the flow restrictor 37 may be located upstream or downstream of the replacement ACOC.

The flow restrictor 37 may include a single or a plurality of orifices. Any suitable flow area reduction geometries may be used without departing from the scope of the present disclosure. In the present embodiment, the orifice 37A is a circular aperture. However, a non-circular aperture, such as oval, elliptical, etc is contemplated. The orifice entry and exit may be sharp, but an orifice having gradual entry and exit is contemplated. For instance, the orifice may have an inlet corner radii so long as effects of frictional component of pressure differential are accounted for.

The principle of the present disclosure may be used to communize coolers across engine models, or to optimise the performance to specific operating conditions. That is, if you have a smaller cooler on one engine model and an oversized cooler on another engine model that may be reduced in size without affecting thermal performance of the system, then it may be possible to take advantage of using that existing cooler while improving weight on the second model. The disclosed oil system 28 with the flow restrictor 37 as described herein above may avoid the need to re-design the components to accept the higher oil pressure, may avoid the resizing of the pumps and nozzles, and may avoid the addition of baffles. This may reduce cost and complexity in derivative designs.

Figure 3A:
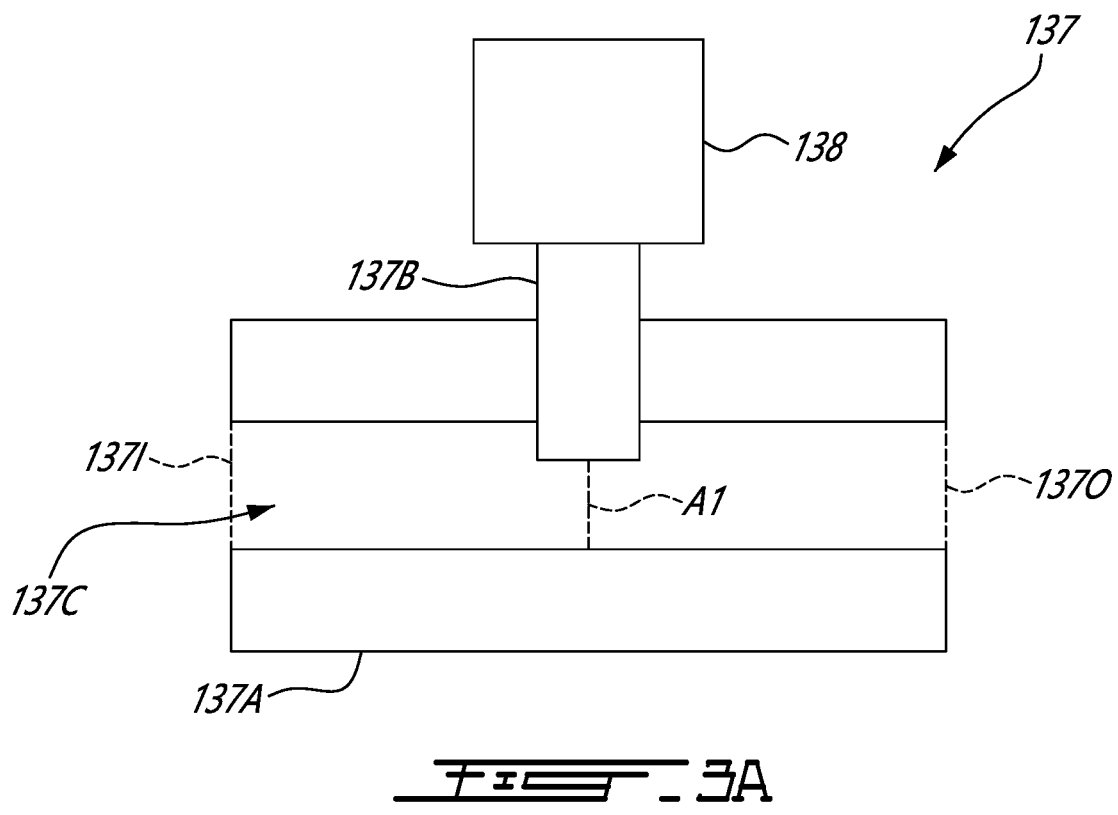
FIG. 3A is a schematic cross-sectional view of a flow restrictor in a first configuration.
Figure 3B:
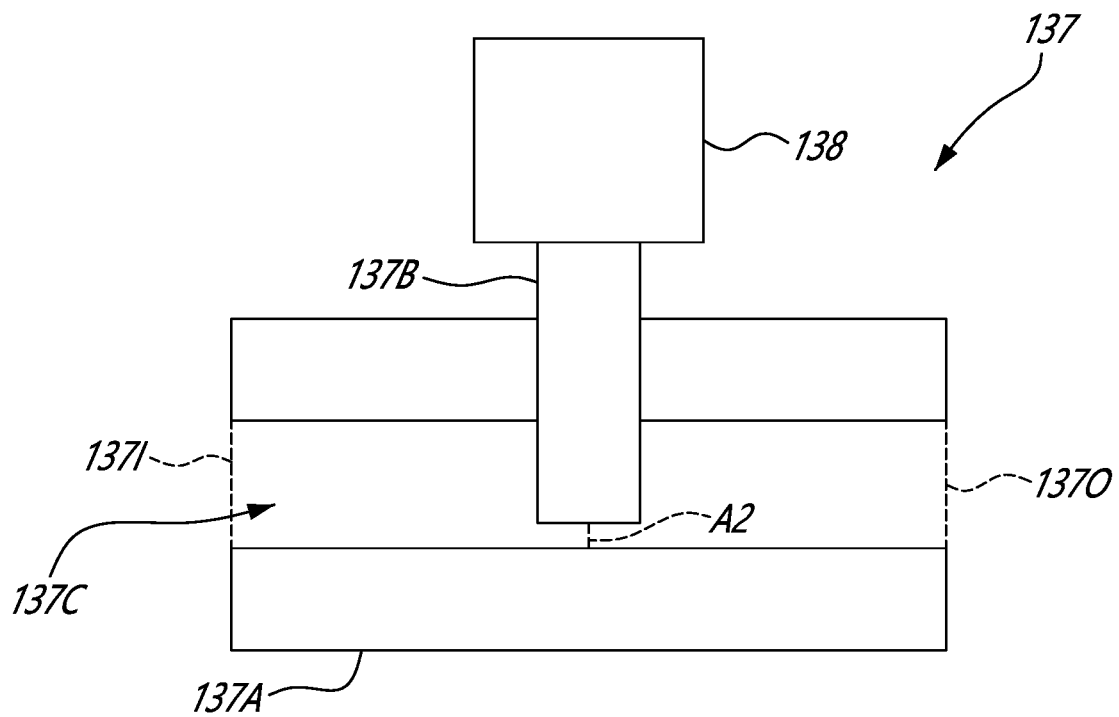
FIG. 3B is a schematic cross-sectional view of the flow restrictor of FIG. 3A in a second configuration.

Referring now to FIGS. 3A and 3B, in an alternate embodiment, a dimension of the orifice may be dynamically adjusted as a function of operating conditions of the gas turbine engine 10. As shown, the flow restrictor 137 of this embodiment includes a housing 137A and a member 137B movable relative to the housing 137A. The housing 137A defines an oil passage 137C. The member 137B may extend substantially transversally in the oil passage 137C to vary a flow surface area of the oil passage 137C. As shown in FIG. 3A, the member 137B extends in the oil passage 137C and creates a first flow circulating area A1. In FIG. 3B, the member 137B extends further in the oil passage 137C to create a second flow circulating area A2 being less than the first flow circulating area A1. Hence, a pressure differential between an inlet 137I an an outlet 137O of the flow restrictor 137 may be greater in the configuration depicted in FIG. 3B than in the configuration depicted in FIG. 3A because of the smaller second flow circulating area A2. It will be appreciated that the member 137B may be a gate movable transversally across the oil passage 137C of the flow restrictor 137. In other embodiments, the member 137B may be a pivotable door, a shutter, a deformable wall, and so on. Any device operable to adjust the size of the oil passage 137C to vary a pressure differential through the flow restrictor 137 is contemplated without departing from the scope of the present disclosure.

Figure 4:
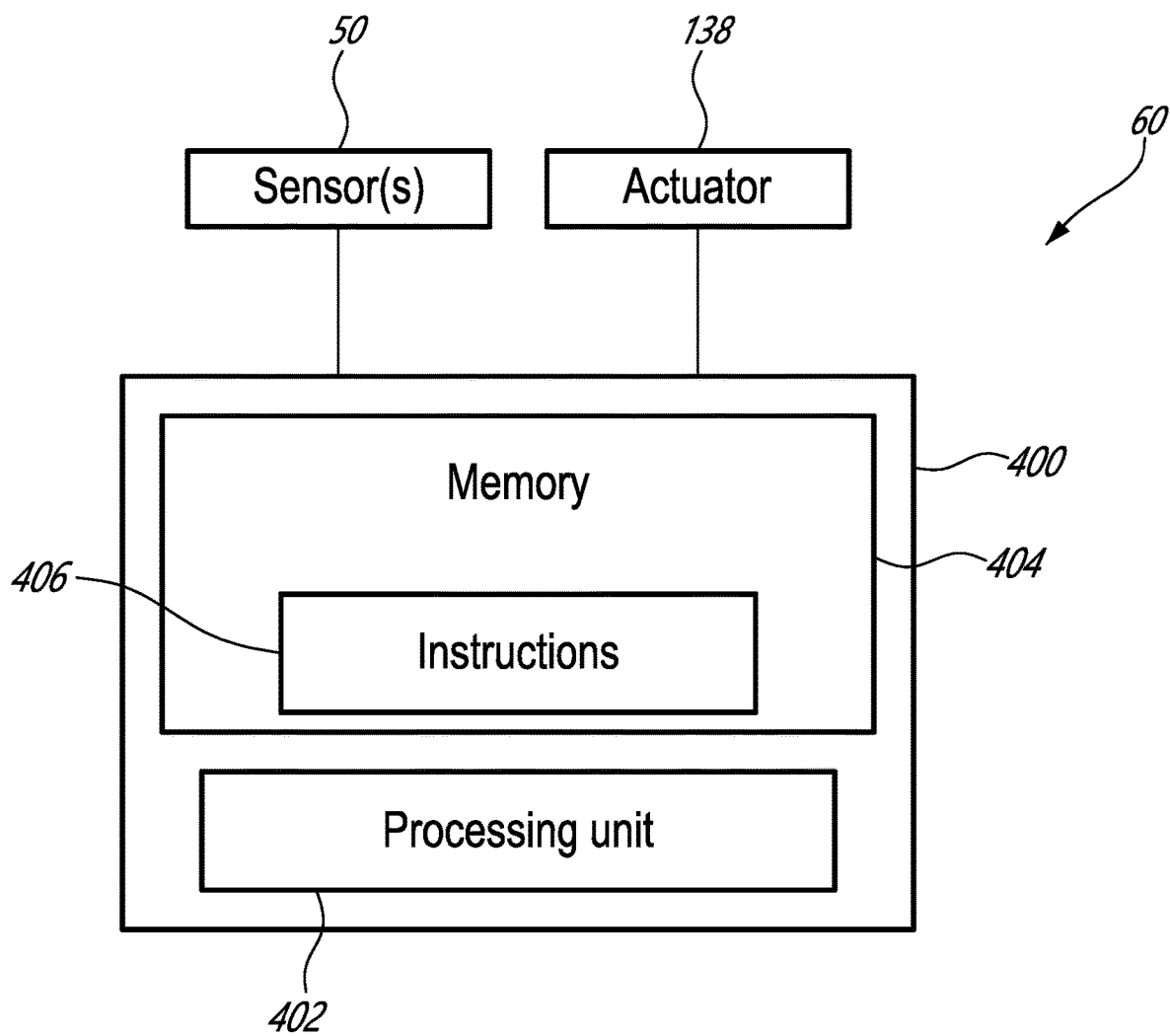
FIG. 4 is a schematic view of a controller in accordance with one embodiment.

In the depicted embodiment, the member 137B is engaged by an actuator 138, which may be a linear actuator such as a solenoid, a pneumatic actuator, a hydraulic actuator. Any suitable actuator may be used. The actuator 138 may be operatively connected to a controller 60 (FIG. 4). The controller 60 may be configured to receive a signal from at least one sensor 50 (FIG. 2), the signal may be indicative of the oil pressure in the oil conduit 33; to determine that the oil pressure is outside of a desired pressure operating range of the components (e.g., gearbox 29, bearing cavities 27, etc) based on the signal received from the at least one sensor 50; and to change a size of the orifice until the oil pressure is within the desired pressure operating range.

In the embodiment shown, the receiving of the signal from the at least one sensor 50 includes receiving the signal from a pressure sensor and/or a temperature sensor operatively connected to the oil conduit 33. To change the size of the orifice, the controller 60 may determine that the oil pressure is below a minimum pressure threshold and increase the size of the orifice. Alternatively, the controller 60 may determine that the oil pressure is above a maximum pressure threshold and decrease the size of the orifice. This variation in the size of the orifice may be performed dynamically and continuously during a flight as a function of the operating conditions of the gas turbine engine 10. In the present embodiment, the changing of the size of the orifice includes powering the actuator 138. Powering the actuator may include supply the actuator 138 with electricity, with compressed air, and/or with a hydraulic fluid.

With reference to FIG. 4, an example of a computing device 400 is illustrated. For simplicity only one computing device 400 is shown but the system may include more computing devices 400 operable to exchange data. The computing devices 400 may be the same or different types of devices. The controller 60 may be implemented with one or more computing devices 400. Note that the controller 60 can be implemented as part of a full-authority digital engine controls (FADEC) or other similar device, including electronic engine control (EEC), engine control unit (ECU), electronic propeller control, propeller control unit, and the like. In some embodiments, the controller 60 is implemented as a Flight Data Acquisition Storage and Transmission system, such as a FAST™ system. The controller X may be implemented in part in the FAST™ system and in part in the EEC. Other embodiments may also apply.

The computing device 400 comprises a processing unit 402 and a memory 404 which has stored therein computer-executable instructions 406. The processing unit 402 may comprise any suitable devices configured to implement the method described above such that instructions 406, when executed by the computing device 400 or other programmable apparatus, may cause the functions/acts/steps performed as part of the method as described herein to be executed. The processing unit 402 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 404 may comprise any suitable known or other machine-readable storage medium. The memory 404 may comprise non-transitory computer readable storage medium, for example, but not limited to, an electronic, magnetic, optical, electromagnetic, infrared, or semiconductor system, apparatus, or device, or any suitable combination of the foregoing. The memory 404 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 404 may comprise any storage means (e.g., devices) suitable for retrievably storing machine-readable instructions 406 executable by processing unit 402.

The methods and systems for controlling the size of the orifice described herein may be implemented in a high level procedural or object oriented programming or scripting language, or a combination thereof, to communicate with or assist in the operation of a computer system, for example the computing device 400. Alternatively, the methods and systems for controlling the size of the orifice may be implemented in assembly or machine language. The language may be a compiled or interpreted language. Program code for implementing the methods and systems for controlling the size of the orifice may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for controlling the size of the orifice may also be considered to be implemented by way of a non-transitory computer-readable storage medium having a computer program stored thereon. The computer program may comprise computer-readable instructions which cause a computer, or more specifically the processing unit 402 of the computing device 400, to operate in a specific and predefined manner to perform the functions described herein, for example those described in the method.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

Referring now to FIG. 5, a method of feeding oil to the components is shown at 500 and includes transferring heat from the oil flow F1 to one or more fluid via a heat exchanger at 502. In the present embodiment, the transferring of the heat includes transferring heat to the air flow F2 via the first heat exchanger 41 and to the fuel flow F3 via the second heat exchanger 42. The method 500 includes decreasing a pressure of the oil flow F1 with the flow restrictor 37, 137 such that the pressure of the oil flow F1 is within a desired pressure operating range of the component (s) downstream of the heat exchanger, which herein includes the first heat exchanger 41 and the second heat exchanger 42, at 504; and feeding the oil flow F2 to the component(s) in need of the oil after the decreasing of the pressure of the oil flow F1 at 506.s In the embodiment shown, the decreasing of the pressure includes flowing the oil flow F1 through the flow restrictor 37, 137 having the orifice 37A sized to create a pressure differential between the inlet 137I and the outlet 137O of the flow restrictor 37, 137.

In some cases, the pressure of the oil flow F1 is dynamically adjusted. This may be done as explained above by receiving a signal from the at least one sensor 50, the signal indicative of the oil pressure; and by determining that the oil pressure is outside the desired pressure operating range of the component based on the signal received from the at least one sensor 50. At which point, the size of the orifice may be changed until the oil pressure is within the desired pressure operating range. The receiving of the signal from the at least one sensor 50 may include receiving the signal from a pressure sensor and/or a temperature sensor operatively connected to the oil conduit 33.

The changing of the size of the orifice may include determining that the oil pressure is below a minimum pressure threshold and increasing the size of the orifice. In some cases, the changing of the size of the orifice may include determining that the oil pressure is above a maximum pressure threshold and decreasing the size of the orifice. The changing of the size of the orifice may be done by powering the actuator 138.

Referring now to FIG. 6, a method of replacing a heat exchanger is shown at 600. The method 600 includes removing the heat exchanger, whether it by the first heat exchanger 41 or the second heat exchanger 42. The heat exchanger providing a first pressure differential to the oil flow F1 flowing therethrough. A replacement heat exchanger may be obtained. The replacement heat exchanger may provide a second pressure differential to the oil flow F2. The second pressure differential may be less than the first pressure differential. The replacement heat exchanger may be connected to the oil system 28, herein, to the oil conduit 33. The flow restrictor 37, 137 may be connected to the oil conduit 33. The flow restrictor may be operable to provide a third pressure differential corresponding to a difference between the first pressure differential and the second pressure differential of the original and replacement heat exchanger to this decrease in pressure differential offered by the replacement heat exchanger.

Dynamically adjusting the size of the orifice may allow to to optimise the performance of components, downstream of the heat exchanger(s), dynamically across the operating envelope. This restrictor could be actuated electrically, magnetically or thermally to achieve the required design area.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An oil system for an aircraft engine, comprising:
 a pump driving an oil flow in an oil conduit, the pump having an outlet pump pressure;
 a heat exchanger providing heat exchange between the oil flow and one or more fluid;
 a component downstream of the heat exchanger, the component fluidly connected to the oil conduit for receiving at least a portion of the oil flow, the component having a maximum oil pressure requirement and a minimum oil pressure requirement; and
 a flow restrictor in fluid flow communication with the oil conduit, the flow restrictor having an orifice sized to provide a restrictor pressure differential across the flow restrictor, the restrictor pressure differential being equal to
 at least the outlet pump pressure minus pressure differentials through the heat exchanger and the oil conduit from an outlet of the pump to the component minus the maximum oil pressure requirement, and
 at most the outlet pump pressure minus the pressure differentials through the heat exchanger and the oil conduit minus the minimum oil pressure requirement.

2. The oil system of claim 1, wherein the component includes one or more bearing cavity and/or a gearbox.

3. The oil system of claim 1, wherein the heat exchanger includes a first heat exchanger providing heat exchange between the oil flow and an air flow and a second heat exchanger providing heat exchange between the oil flow and a fuel flow.

4. The oil system of claim 3, wherein the flow restrictor is hydraulically connected to the oil conduit downstream of the second heat exchanger.

5. The oil system of claim 3, wherein the flow restrictor is hydraulically connected on the oil conduit upstream of the first heat exchanger.

6. The oil system of claim 1, wherein a size of the orifice is variable.

7. The oil system of claim 6, comprising a member being movable to vary the size of the orifice, the member engaged by an actuator.

8. The oil system of claim 7, wherein the actuator is operatively connected to a controller having a processing unit operatively connected to a computer-readable medium having instructions stored thereon executable by the processing unit for:
 receiving a signal from at least one sensor, the signal indicative of an oil pressure in the oil conduit;
 determining that the oil pressure is outside a desired pressure operating range of the component based on the signal received from the at least one sensor; and
 changing the size of the orifice until the oil pressure is within the desired pressure operating range.

9. The oil system of claim 8, wherein the receiving of the signal from the at least one sensor includes receiving the signal from a pressure sensor and/or a temperature sensor operatively connected to the oil conduit.

10. The oil system of claim 8, wherein the changing of the size of the orifice includes:
 determining that the oil pressure is below the minimum oil pressure requirement; and
 increasing the size of the orifice.

11. The oil system of claim 8, wherein the changing of the size of the orifice includes:
 determining that the oil pressure is above the maximum oil pressure requirement; and
 decreasing the size of the orifice.

12. The oil system of claim 8, wherein the changing of the size of the orifice includes powering the actuator.

13. A method of feeding oil of an oil system to a component of an aircraft engine, comprising:
 transferring heat from an oil flow to one or more fluid via a heat exchanger;
 decreasing a pressure of the oil flow with a flow restrictor such that the pressure of the oil flow is within a desired pressure operating range of the component downstream of the heat exchanger; and
 feeding the oil flow to the component in need of oil after the decreasing of the pressure of the oil flow;
 wherein the decreasing of the pressure with the flow restrictor includes flowing the oil flow through the flow restrictor having an orifice sized to create a restrictor pressure differential being equal to:
at least an outlet pump pressure of a pump driving the oil flow in an oil conduit of the oil system minus pressure differentials through the heat exchanger and the oil conduit from an outlet of the pump to the component minus a maximum oil pressure requirement of the desired pressure operating range, and at most the outlet pump pressure minus the pressure differentials through the heat exchanger and the oil conduit minus a minimum oil pressure requirement of the desired pressure operating range.

14. The method of claim 13, comprising dynamically adjusting the pressure of the oil flow.

15. The method of claim 14, comprising:
receiving a signal from at least one sensor, the signal indicative of the pressure;
determining that the pressure is outside the desired pressure operating range of the component based on the signal received from the at least one sensor; and
changing a size of an orifice until the pressure is within the desired pressure operating range.

16. The method of claim 15, wherein the receiving of the signal from the at least one sensor includes receiving the signal from a pressure sensor and/or a temperature sensor operatively connected to the oil system.

17. The oil system of claim 15, wherein the changing of the size of the orifice includes:
determining that the pressure is below a minimum oil pressure requirement; and
increasing the size of the orifice.

18. The oil system of claim 15, wherein the changing of the size of the orifice includes:
determining that the pressure is above a maximum oil pressure requirement; and
decreasing the size of the orifice.

* * * * *